United States Patent
Kajouke et al.

[11] Patent Number: 6,166,934
[45] Date of Patent: *Dec. 26, 2000

[54] HIGH EFFICIENCY POWER SYSTEM WITH PLURAL PARALLEL DC/DC CONVERTERS

[75] Inventors: Lateef A. Kajouke, San Pedro; Steven E. Schulz, Redondo Beach, both of Calif.

[73] Assignee: General Motors Corporation, Detroit, Mich.

[*] Notice: This patent is subject to a terminal disclaimer.

[21] Appl. No.: 09/345,268

[22] Filed: Jun. 30, 1999

[51] Int. Cl.$^7$ .................................................. H02M 3/00
[52] U.S. Cl. ................................................................ 363/65
[58] Field of Search ......................................... 363/65, 71

[56] References Cited

U.S. PATENT DOCUMENTS

| | | | |
|---|---|---|---|
| 5,530,635 | 6/1996 | Yashiro | 363/65 |
| 5,768,117 | 6/1998 | Takahashi et al. | 363/65 |
| 5,803,215 | 9/1998 | Henze et al. | 191/2 |
| 5,821,755 | 10/1998 | Henze | 324/426 |
| 5,875,104 | 2/1999 | Prager | 363/65 |
| 5,883,797 | 3/1999 | Amaro et al. | 363/71 |
| 5,923,549 | 7/1999 | Kobayashi et al. | 363/65 |

*Primary Examiner*—Jeffrey Sterrett
*Attorney, Agent, or Firm*—Christopher DeVries

[57] ABSTRACT

Distributed staged power systems and control methods for use in supplying power to a load of electric and hybrid electric vehicles. The systems comprise a plurality of parallel DC-to-DC power modules whose output power is controlled in accordance with the various control methods. The distributed staged power systems provide higher efficiency because of smart staging of the power modules. The control methods enable or disable selected power modules as determined to provide the highest possible power conversion efficiency.

16 Claims, 3 Drawing Sheets

HIGH EFFICIENCY POWER SYSTEM WITH PLURAL PARALLEL DC/DC CONVERTERS

BACKGROUND

The present invention relates generally to electric vehicles, and more particularly, to improved control methods that control a high efficiency distributed staged power system used in electric and hybrid electric vehicles.

The assignee of the present invention designs and develops electric vehicles and power systems for use therein. Prior art related to power systems for electric vehicles include single-module-level designs and power modules interconnected for current sharing and reliability. There are a variety of documents, including patents and articles, that describe single, high-efficiency DC-to-DC converters. Other documents discuss the interconnecting the power modules to achieve current sharing and reliability.

Prior art distributed power systems typically utilize either a single bulk power supply or multiple parallel power modules configured in a current share mode. However, power electronics are now being incorporated in to electric and hybrid electric vehicles that require very high efficiency power conversion in order to maintain an acceptable driving range. The requirement is even more severe in a hybrid electric vehicle, where the auxiliary load is quite large due to the increased numbers of fans and pumps compared with an electric vehicle.

Prior art power systems have low efficiency when load demand drops. This is true for either the single, large, bulk power supply or with multiple-parallel power modules, configured in a current share mode. In the multiple-parallel power module system, with all modules equally sharing the load current, each module provides only a small fraction of its overall load capability most of the time. The well-known efficiency versus load characteristics of switching power supplies indicates that operation at light load results in inefficient operation.

The present control methods have been developed to control a high efficiency distributed staged power system which is disclosed in U.S. patent application, Ser. No. 09/345,278, filed Jun. 30, 1999, entitled "High Efficiency, Distributed Staged Power System Architecture for Electric Vehicle Accessories Power", and which is assigned to the assignee of the present invention. For reference purposes, the contents of this patent application are incorporated herein in its entirety.

It would therefore be desirable to have improved control methods that may be used to control a high efficiency distributed staged power system.

SUMMARY OF THE INVENTION

The present invention provides for high efficiency distributed staged power systems and control methods for use therein. An exemplary high efficiency distributed staged power system comprises an energy storage unit coupled by way of a high voltage bus to an input filter. A parallel voltage converter comprising a plurality of power modules are respectively coupled in parallel between the input filter and an output filter. A low voltage bus is coupled between the output filter and one or more loads. Input and output control signal interfaces are coupled to each of the plurality of power modules.

Control circuitry is provided that implements the control methods. In certain embodiments, a smart controller is coupled to input and output control signal interfaces, and also may be coupled to a vehicle controller, and which implements the control methods. The control circuitry controls the respective power output of each of the power modules to enable/disable selected modules to provide the highest possible power conversion efficiency.

The distributed staged power system enables or disables each of the modules as determined by the control circuitry to provide the highest possible conversion efficiency. This concept may be extended to any parallel power module configured system where the module efficiency is not constant with respect to load. The control circuitry and control methods operate on the fact that the module efficiency varies with load, so that an optimal operating point exists.

The control methods control the distributed staged power system to enable or disable selected power modules to provide the highest possible conversion efficiency. Such control may be implemented in the control circuitry, such as the smart controller, for example. This concept may be extended to any parallel power module configured system where the module efficiency is not constant with respect to load.

The distributed staged power systems and control methods provide improved reliability and vehicle range (due to increased efficiency). Other known alternatives yield lower power system performance. The control methods cause the systems to have a flatter efficiency curve from minimum load to maximum load and thus provides for higher efficiency. The present invention is flexible with regard to changes in load demand, and cycles power modules to achieve even thermal stress. The control methods provide for optimum power system dynamic and static regulation.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
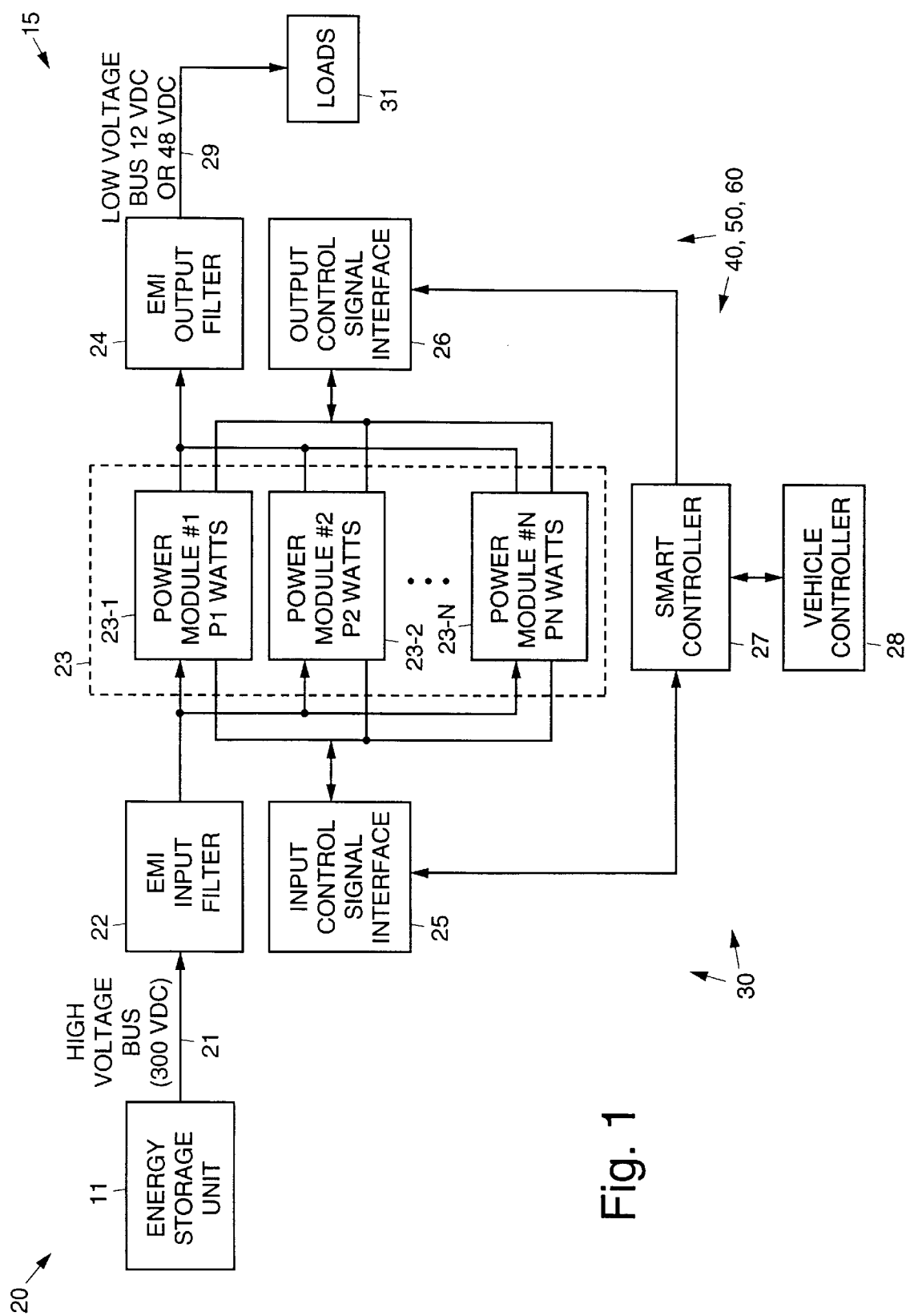
FIG. 1 illustrates an exemplary high efficiency distributed staged power system that may employ control methods in accordance with the principles of the present invention.

Referring to the drawing figures, FIG. 1 illustrates an exemplary high efficiency distributed staged power system 20 that may employ control methods 40, 50, 60 in accordance with the principles of the present invention. Exemplary control methods 40, 50, 60 are discussed with reference to FIGS. 2–7. The high efficiency distributed staged power system 20 is designed for use in electrical and hybrid electrical vehicles 15, such as those developed by the assignee of the present invention, for example.

The high efficiency distributed staged power system 10 is used as a voltage translator between energy storage units 11, batteries 11 or other transient energy storage devices 11, and ancillary subsystems on-board the electric and hybrid electric vehicle 15 and are represented by loads 31.

The high efficiency distributed staged power system 20 comprises an energy storage unit 11 that is coupled by way of a high voltage bus 21 to an electromagnetic (EMI) input filter 22. The output of the input filter 22 is coupled to a parallel voltage converter 23 comprising a plurality of parallel power modules 23-1, 23-2, . . . 23-N. The outputs of the plurality of parallel power modules 23-1, 23-2, . . . 23-N of the parallel voltage converter 13 are coupled to an EMI output filter 24. The output of the output filter 24 is coupled by way of a low voltage bus 29 to provide 12 VDC or 48 VDC, for example, to loads 31, including accessories of the electric or hybrid electrical vehicle 15.

The system also comprises control circuitry 30 which may optionally be implemented by a smart controller 27 coupled to a vehicle controller 28 and coupled to input and output control signal interfaces 25, 26. The input and output control signal interfaces 25, 26 are respectively coupled to each of the parallel power modules 23-1, 23-2, . . . 23-N of the parallel voltage converter 23.

The energy storage unit 11 provides an energy source for the system 20. The energy storage unit 11 may be comprised of a battery pack, a fuel cell, a super capacitor, a motor/generator set, or any combination thereof. The energy storage unit 11 outputs a high voltage, typically 300 VDC or more.

The output of the energy storage unit 11 is connected to the high voltage bus 21. The high voltage bus 21 serves to distribute the high voltage to various high voltage systems in the vehicle 15. Some of the systems that may be connected to the high voltage bus 21 include a traction motor drive inverter, a power-steering motor drive inverter, an air-conditioning compressor motor drive inverter, and an accessory power system.

The power modules 23-1, 23-2, . . . 23-N typically comprise high-efficiency switching power supplies. The switching power supplies tend to generate unwanted electrical noise and are therefore filtered. The input filter 22 is provided to isolate the noisy power modules 23-1, 23-2, . . . 23-N from the energy storage unit 11. The input filter 22 is designed to minimize ripple current drawn from the energy storage unit 11, such that conducted and radiated electromagnetic noise emissions from the system 20 are acceptable. The input filter 22 also serves to minimize harmful transients, which may be generated at the energy storage unit 11 and propagate to the power modules 23-1, 23-2,. .. 23-N, causing degradation of components and system failure.

The control methods 40, 50, 60 used in the high efficiency distributed staged power system 20 process the load demand and provides a smart decision to switch in or out a specific number of the power modules 23-1, 23-2, . . . 23-N at a given operating load of the accessories of the hybrid electrical vehicle 15.

Figure 2:
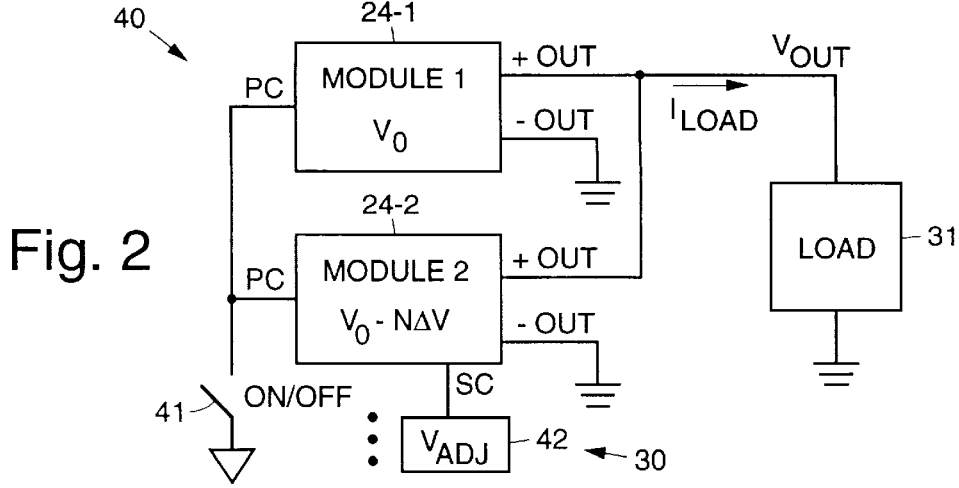
FIG. 2 illustrates a first exemplary control method for use in the high efficiency distributed staged power system shown in FIG. 1.
Figure 3:
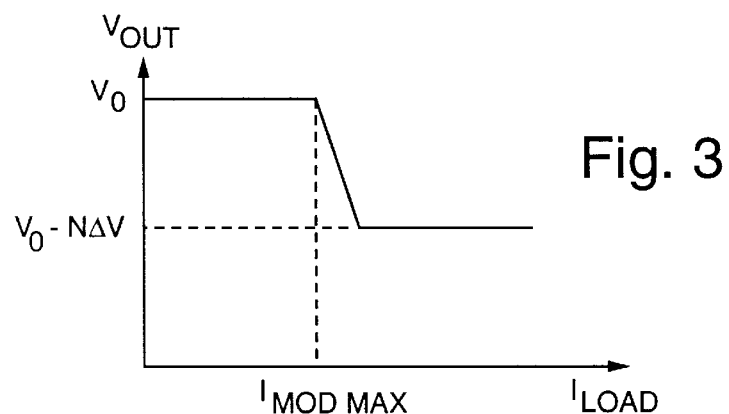
FIG. 3 is a graph of output voltage versus load current for the control method shown in FIG. 2.
Figure 4:
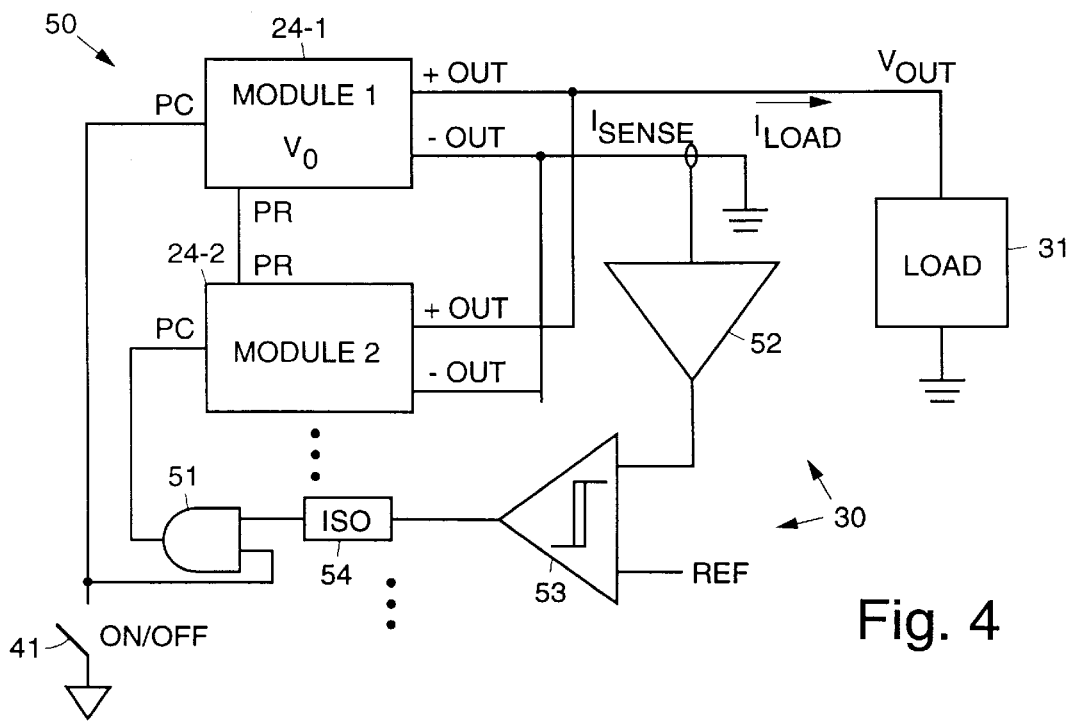
FIG. 4 illustrates a second exemplary control method for use in the high efficiency distributed staged power system shown in FIG. 1.
Figure 5:
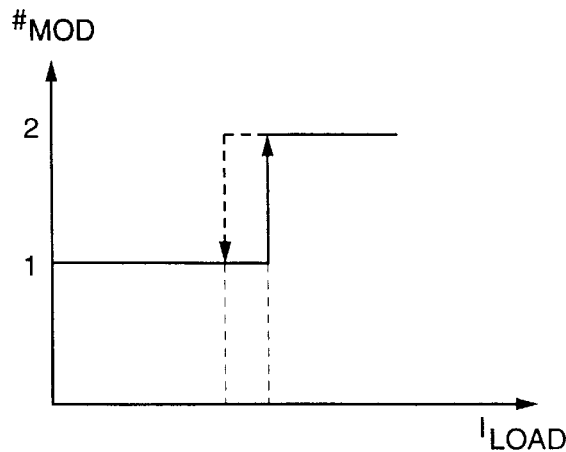
FIG. 5 is a graph showing the number of power modules versus load current for the control method shown in FIG. 4.
Figure 6:
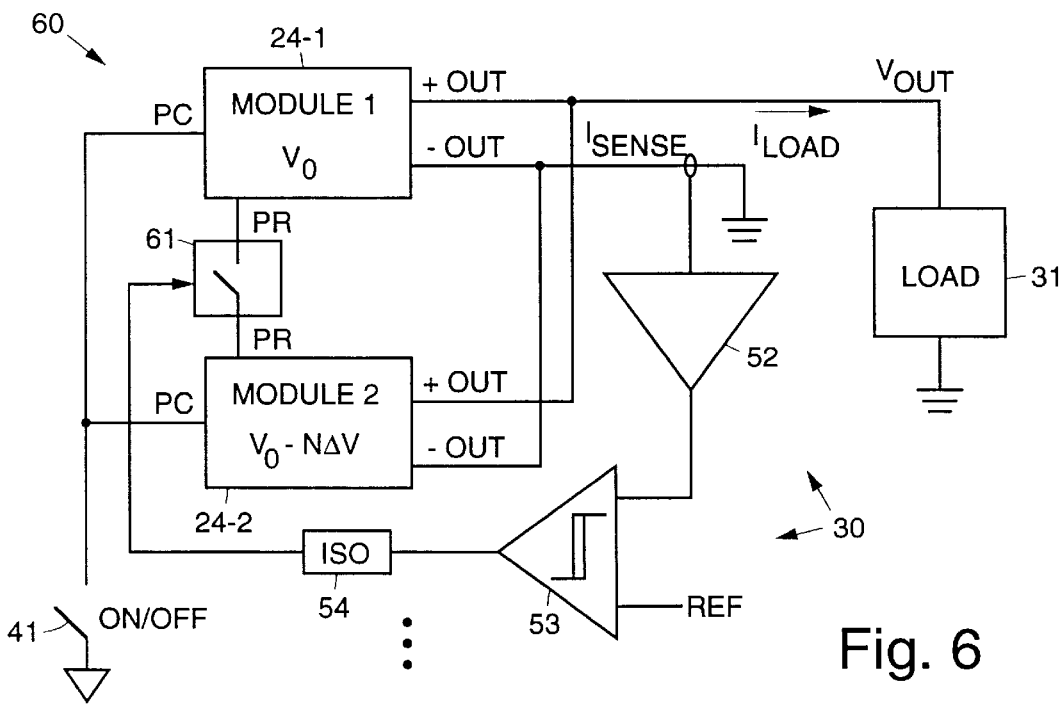
FIG. 6 illustrates a third exemplary control method for use in the high efficiency distributed staged power system shown in FIG. 1.
Figure 7:
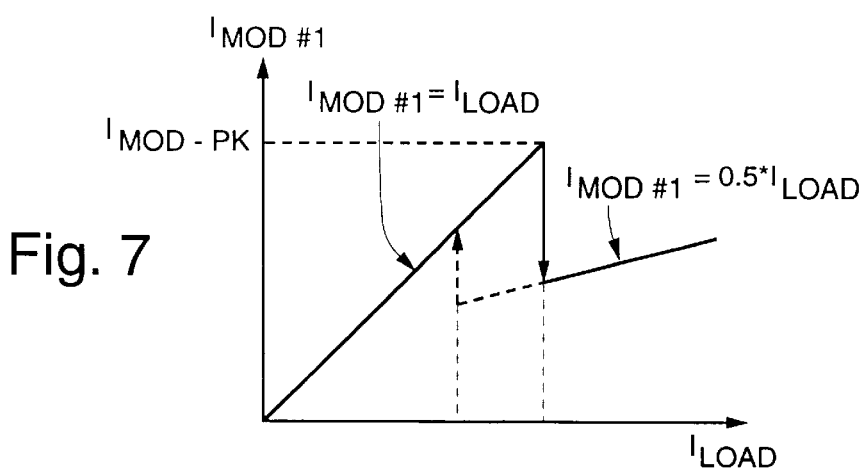
FIG. 7 is a graph showing the current in the master power module versus total load current for the control method shown in FIG. 6.

FIGS. 2, 4, and 6 illustrate three exemplary control methods 40, 50, 60 for controlling the high efficiency distributed staged power system 20. FIGS. 3, 5 and 7 illustrate graphs of various parameters associate with each respective control method 40, 50, 60. The characteristics of each control method 40, 50, 60 are discussed below.

Referring to FIG. 2, it shows the first control method 40. The first control method 40 is based upon setting the output voltage of each power module 23-1, 23-2, . . . 23-N in the manner described in the following paragraph. In FIG. 2, two power modules 23-1, 23-2 are shown that are connected in parallel and supply current to the load 31. An on/off switch 41 turns on and off both of the power module 23-1, 23-2. A voltage adjustment signal ($V_{adj}$) is supplied to the second power module 23-2 by voltage adjustment circuitry 42 that sets its output voltage. This remaining power modules 23-3, . . . 23-N are each coupled to the switch 41 and coupled to receive respective voltage adjustment signals.

The output voltage of the first power module 23-1 is set=$V_o$, the output voltage of the second power module 23-2 is set=$V_o-\Delta V_o$, and the output voltage of each Nth power module 23-N is set=$V_o-(N-1)*\Delta V_o$, where $V_o$ is the desired bus voltage, N is an integer between 1 and the total number of the power modules, and $\Delta V_o$ is a small voltage increment. As the load demand increases and reaches the maximum current handling capability of the first power module 23-1, its output voltage drops to $V_o-\Delta V_o$ and the second power module 23-2 supplies the power demand beyond the power handling capability of the first module 23-2. The process continues until the N–1th power module 23-N-1 (not shown) is switched on and provides its output power.

The first control method 40 is self sufficient and does not require the smart controller 27 or current sensing. The first control method 40 provides no current sharing and does not balance the thermal stress between the N power modules 23-1, 23-2, . . . 23-N. The first control method 40 also produces a non-optimum system dynamic and steady state regulation of the output bus 29.

Referring to FIG. 4, it shows the second control method 50. The second control method 50 uses an on/off switch 41 to turn on the first power module 23-1. The switch signal is coupled to a first input of a trigger circuit 51, shown as an AND gate 51. A differential amplifier 52 is used to sense the total load current. The sensed output of the differential amplifier 52 is input to a first input of a comparator 53 which has a reference voltage (REF) applied to its second input. The output of the comparator 53 is coupled through an isolator (ISO) 54 to a second input of the AND gate 51. The comparator 53, isolator 54, and the AND gate 51 are replicated for each of the remaining power modules 23-3, . . . 23-N (not shown). Each comparator 53 has a different reference voltage (REF) applied thereto.

The second control method 50 uses N power modules 23-1, 23-2, . . . 23-N, and the first power module 23-1 is enabled while the other N–1 power modules 23-2, . . . 23-N are off. As the system load demand increases the smart controller 27, which embodies the current sensing circuitry described above, detects a preset threshold current and switches on the next power module 23-2. The sequence of switching the rest of the power modules 23-3, . . . 23-N continues in a similar fashion until the N–1th module 23-N-1 is turned on.

The second control method 50 provides current sharing and thermal balance between active power modules 23-1, 23-2, . . . 23-N. However the system current slew rate response is limited by start up delays of the power modules 23-1, 23-2, . . . 23-N, and requires the load current sensing.

Referring to FIG. 6, it shows the third control method 60. The third control method 60 uses an on/off switch 41 to turn on the power modules 23-1, 23-2, . . . 23-N. A differential amplifier 52 is used to sense the total load current. The sensed output of the differential amplifier 52 is input to a first input of a comparator 53 which has a reference voltage (REF) applied to its second input. The output of the comparator 53 is coupled through an isolator (ISO) 54 to a control input of an analog switch 61. The comparator 53, isolator 54, and analog switch circuitry is replicated for each of the remaining power modules 23-3, . . . 23-N (not shown).

In the third control method 60, resonant power modules (converters) 23-1, 23-2, . . . 23-N are used. The third control method 60 relies on the principle that frequency 25 synchronized resonant power modules 23-1, 23-2, . . . 23-N will force current sharing among the power modules 23-1, 23-2, . . . 23-N. The control method 60 is also based upon a master/slave concept, with the master (first) power module 23-1 set at the required bus voltage $V_o$, and the slave power module 23-2 set at $V_o-\Delta V$. This concept is also replicated for the remaining power modules 23-3, . . . 23-N (not shown) such that each of the other power modules 23-3, . . . 23-N may be frequency synchronized to the master power module 23-1.

In the third control method 60, all power modules 23-1, 23-2, . . . 23-N are enabled at all times. However, the smart controller 27 (which implements the current sensing and analog switch circuitry) determines how many power modules 23-1, 23-2, . . . 23-N should be frequency synchronized to the master power module 23-1 to provide the required load demand. The remaining modules 23-2, . . . 23-N are in an active standby mode. When the smart controller 27 detects that the load demand is increased, additional power modules 23-2, . . . 23-N are synchronized to the master power module 23-1 as required.

In the third control method 60, the output voltage is always set to $V_o$, which is the desired voltage of the low voltage bus 29. In comparison, the first control method 40 has an inefficiently regulated low voltage bus 29. Also, in the third control method 60, the slave power modules 23-2, . . . 23-N are in an active standby mode, which improves the current slew rate response of the system 20 over that of the second control method 50.

Thus, control methods that may be used to implement a high efficiency distributed staged power system used in electric and hybrid electric vehicles have been disclosed. It is to be understood that the above-described embodiments are merely illustrative of one of the many specific embodiments that represent applications of the principles of the present invention. Clearly, numerous and other arrangements can be readily devised by those skilled in the art without departing from the scope of the invention.

What is claimed is:

1. A high efficiency distributed staged power system comprising:
   an energy storage unit;
   a high voltage DC bus coupled to the energy storage unit;
   an input filter coupled to the high voltage DC bus;
   a voltage converter comprising a plurality of power modules, at least one of the power modules coupled to the input filter;
   an output filter coupled to the voltage converter;
   a low voltage bus coupled, between the output filter and a load; and
   control circuitry coupled to the power modules that controls the respective power output of each of the power modules to enable/disable selected modules to add and subtract output to provide the highest possible power conversion efficiency.

2. The system recited in claim 1 wherein the control circuitry comprises:
   an on/off switch for turning on and off the power module; and
   voltage adjustment circuitry for supplying voltage adjustment signals ($V_{adj}$) to all but the first power module that sets their respective output voltages;
   and wherein the output voltage of the first power module is set equal to the desired output voltage ($V_o$) of the low voltage bus, and the output voltage of each Nth power module is set=$V_o-(N-1)*\Delta V_o$, where $V_o$ is the desired bus voltage, N is an integer between 1 and the total number of the power modules, and $\Delta V_o$ is a small voltage increment.

3. The system recited in claim 1 wherein the control circuitry comprises:
   current sensing circuitry for sensing the total output current and for providing a sense voltage corresponding thereto, for comparing the sense voltage to a reference voltage, and for outputting a trigger signal when the sense voltage is above the reference voltage to turn on the succeeding power module to supply power in combination with the preceding power module to the load.

4. The system recited in claim 1 wherein the control circuitry comprises:
   an on/off switch for turning on and off the power module;
   differential amplifier circuitry for sensing the total output current and for providing a sense voltage corresponding thereto;
   comparator circuitry for comparing the sense voltage to a reference voltage and for outputting a signal when the sense voltage is above the reference voltage;
   a trigger circuit for outputting a trigger signal when the sense voltage is above the reference voltage to turn on the succeeding power module in combination with the preceding power module to supply power to the load.

5. The system recited in claim 1 wherein the control circuitry comprises:
   an on/off switch for turning on and off the power module; and
   current sensing circuitry for sensing the total output current and for providing a sense voltage corresponding thereto, for comparing the sense voltage to a reference voltage and for outputting a signal when the sense voltage is above the reference voltage to frequency synchronize the succeeding power module to the preceding power module to supply power in combination with the preceding power module to the load.

6. The system recited in claim 1 wherein the control circuitry comprises:
   an on/off switch for turning on and off the power module;
   differential amplifier circuitry for sensing the total output current and for providing a sense voltage corresponding thereto;
   comparator circuitry for comparing the sense voltage to a reference voltage and for outputting a signal when the sense voltage is above the reference voltage;
   switch circuitry for frequency synchronizing the succeeding power module to the preceding power module when the sense voltage is above the reference voltage so that the succeeding and preceding power modules supply power in combination to the load.

7. The system recited in claim 1 wherein the control circuitry comprises:
   an input control signal interface coupled to the voltage converter;

an output control signal interface coupled to the voltage converter; and a smart controller coupled to the input and output control signal interfaces.

8. The system recited in claim 7 further comprising a vehicle controller coupled to the smart controller.

9. The system recited in claim 1 wherein the energy storage unit is a battery.

10. A method of supplying power to a load of an electric vehicle that comprises an energy storage unit coupled to a high voltage bus, and a voltage converter having a plurality of power modules coupled in parallel that is coupled to the high voltage bus by way of an input filter, and that is coupled by way of an output filter to a low voltage bus that coupled to the load, the method comprising the steps of:

selectively turning on each of the power modules; and controlling the power output of each of the power modules by enabling/disabling selected modules to add and subtract voltage output to provide an optimum power conversion efficiency from the plurality of power modules.

11. The method recited in claim 10 wherein the step of controlling the power output of each of the power modules comprises the steps of:

sensing the total load current and providing a sense voltage corresponding thereto;

comparing the sense voltage to a reference voltage; and outputting a trigger signal when the sense voltage is above the reference voltage to turn on the succeeding power module to supply power to the load in combination with the preceding power module.

12. The method recited in claim 11 wherein a first power module is enabled and the other N−1 power modules are off, and as the load demand increases, a preset threshold current level corresponding to the reference voltage is detected, and succeeding power modules are turned on to provide current sharing and thermal balance between active power modules.

13. The method recited in claim 10 wherein the plurality of power modules are staged on or off as a function of load requirements.

14. The method recited in claim 10 wherein the step of controlling the power output of each of the power modules comprises the steps of:

supplying voltage adjustment signals to all but the first power module that sets their respective output voltages;

setting the output voltage of the first power module equal to the desired output voltage ($V_o$) of the low voltage bus; and setting the output voltage of each Nth power module is set=$V_o-(N-1)*\Delta V_o$, where $V_o$ is the desired bus voltage, N is an integer between 1 and the total number of the power modules, and $\Delta V_o$ is a small voltage increment.

15. The method recited in claim 10 wherein the step of controlling the power output of each of the power modules comprises the steps of:

sensing the total load current and providing a sense voltage corresponding thereto;

comparing the sense voltage to a reference voltage; and outputting a signal when the sense voltage is above the reference voltage to frequency synchronize the succeeding power module to the master power module to supply power in combination to the load.

16. A high efficiency distributed staged power system for use in a vehicle, the high efficiency distributed stage power system comprising:

an energy storage unit disposed within the vehicle;

a high voltage DC bus coupled to the energy storage unit;

an input filter coupled to the high voltage DC bus;

a voltage converter comprising a plurality of power modules, at least one of the power modules coupled in parallel to the input filter;

an output filter coupled to the voltage converter;

a low voltage bus coupled between the output filter and a load, supplying power to an electrical system of the vehicle; and control circuitry coupled to the power modules that controls the respective power output of each of the power modules to enable/disable selected modules to add and subtract output to provide the highest possible power conversion efficiency.

* * * * *